United States Patent [19]

Saville, III et al.

[11] Patent Number: 5,121,492

[45] Date of Patent: Jun. 9, 1992

[54] SYSTEM FOR SIMULATING ACCESS TIMES OF A CD ROM ON A HARD DISK BY SLOWING THE OPERATION OF THE HARD DISK

[75] Inventors: Winthrop L. Saville, III, Carlsbad; Raymond Klein, Ramona; Frederick P. Meyer, Santa Cruz; Michael P. Prussian, Aptos, all of Calif.

[73] Assignee: Meridian Data, Inc., Scotts Valley, Calif.

[21] Appl. No.: 21,302

[22] Filed: Mar. 2, 1987

[51] Int. Cl.$^5$ .................. G06F 9/455; G06F 12/02; G06F 13/00

[52] U.S. Cl. .................. 395/500; 364/232.3; 364/249.6; 364/260; 364/271.4; 364/927.81; 364/950.4; 364/952.31

[58] Field of Search ... 364/200 MS File, 900 MS File, 364/578, 551.01; 395/500

[56] References Cited

U.S. PATENT DOCUMENTS

| | | | |
|---|---|---|---|
| 4,499,536 | 2/1985 | Gemma et al. | 364/200 |
| 4,511,963 | 4/1985 | Kantner | 364/200 |
| 4,660,106 | 4/1987 | Harrison et al. | 360/77 |
| 4,775,969 | 10/1988 | Osterlund | 369/53 |
| 4,953,122 | 8/1990 | Williams | 364/900 |

*Primary Examiner*—Thomas C. Lee
*Assistant Examiner*—Ayni Mohamed
*Attorney, Agent, or Firm*—James E. Eakin

[57] ABSTRACT

A simulation system for simulating transfer operation of blocks of data in a target data storage unit such as an optical compact disk read only memory. Blocks of the data are contained in a memory to which a simulation computer has direct access without requiring that the target data storage unit be operatively connected to the simulation computer. Simulation comprises the steps of characterizing a hypothetical transfer of data operation of the target data storage unit by calculating its performance characteristics for the particular transfer operation in units of time; controlling direct access by the simulation computer to the data in the memory in accordance with the calculated performance time, and providing the results of the direct access simulation to the user. Simultaneous simulations of the target data storage unit may be carried out for the same or different types of host computers.

20 Claims, 4 Drawing Sheets

SYSTEM FOR SIMULATING ACCESS TIMES OF A CD ROM ON A HARD DISK BY SLOWING THE OPERATION OF THE HARD DISK

FIELD OF THE INVENTION

The present invention relates to methods and apparatus for developing computer software programs and data bases. More specifically, the present invention relates to a system for developing and full simulation testing of software programs and data bases intended to be embodied and/or distributed in a wide variety of media and formats, including optical read only memory.

BACKGROUND OF THE INVENTION

There are many forms of media suitable for storing vast amounts of information. Such information is typically arranged in the form of data bases. These data bases are usually compilations of data or information which are arranged and stored on media capable of being accessed and read automatically by computing machinery. Examples of data bases are dictionaries, indexes of periodical literature, encyclopedias, lists, directories, numerical tables, and/or combinations of any of the above. An entire library may be collected and stored as a data base, and as such, the amount of information so collected and stored can be vast. In the development of a software system or data base, important characteristics are capacity, speed of retrieval of data, and data transfer rate. These characteristics may determine in large measure whether a particular software offering will be a commercial success or not.

In a digital computer environment, when a data base is "on line" or is accessible directly by a user of the digital computer, the user should be able to scan the data base for a particular characteristic or item of information and thereby locate and retrieve particular information from the data base.

Large computers, called "main frames", have been equipped with considerable storage capacity so as to be able to store and process very large data bases very rapidly. Unfortunately, such computers have been very expensive, and very large, requiring rooms and special power and cooling environments for proper operation.

With the advent and widespread proliferation of microprocessor-based computers, generically referred to as "personal computers", a need for direct access to large data bases by such computers has arisen. Indirect access has been made available via telecommunications connections to central computer facilities which manage data bases. Such access via the telephone network has been slow, cumbersome and expensive for the end user. Also, the public access to such data bases inherently has lacked privacy and/or physical security and has thus prevented some important types of information collections from being made available to selected users.

Simultaneously with the proliferation of personal computers, technological advances in mass storage media and devices have resulted in small plastic optical storage disks for home entertainment applications such as video playback records, and audio playback disks (called compact disc or "CD"). These light reflective optical media are formed with reflective "pits" so that the lengths of these pits and the distances between them may be scanned by a laser-diode-generated light beam in order to recover the data represented thereby. The CD has the capability to store vast quantities of information in digital form. For example, an audio-size CD (having a nominal diameter of only 120 mm and a thickness of 1.22 mm is capable of storing approximately 663 megabytes of digital data ("CD rom").

When CD roms are installed in a suitable playback unit, and when the playback unit is connected to the host computer via a suitable hardware interface connection and software "device driver", the digital information stored on the optical disk may thereupon be directly accessed and/or processed by the host computer, depending upon the computational or processing application being carried out.

CD roms and playback units come from a variety of different manufacturing sources and may assume a variety of data formats and characteristics Similarly, there are a wide variety of personal computers and operating systems with which CD roms and their playback units may be used and, each of these has its own particular operating system and characteristics.

While vast quantities of digital data may be fixed on CD rom, this particular medium has its own peculiar characteristics, based on the arrangement of the data blocks in the single spiral track formed on the data surface of the disk. Depending upon the arrangement of the data on the disk, it may be necessary for the disk player to reposition its optical stylus radially by moving from an inner radial location of the disk track to an outer radial location, or conversely. This repositioning may require considerable time, measured in seconds. Such time delays associated with the data access process may lead to undesirable performance characteristics of CD rom digital playback units connected to target host computing machines.

Before a CD rom containing computer information may be confidently released for manufacture and publication, it must be tested in its intended playback environment of a particular target host computer. It is not unusual for as many as twelve test versions of a CD rom to be required incident to the testing environment, so that a particular application program/data base may be optimized with respect to the characteristics of the CD rom, its playback unit, and the target computing machine with which it is to be connected and used.

One drawback of CD roms is the very high initial manufacturing cost for producing a single test CD rom. Typically, the cost for a test CD rom is about $4,000.00. One other significant drawback is the time required for manufacture of a test CD rom. Typical manufacturing turn-around is about one month. If twelve test disks are required by the software publisher in order to be sure that its software product is debugged to the point of commercial acceptability, the process could likely require about one year development time and about a $50,000.00 investment in test disks (before a production disk master could be made).

Before the introduction of a commercial embodiment of the present invention, the business of assembling data into a form suitable for fixation onto an optical CD rom was largely carried out by service bureaus. Such service bureaus typically received raw data from the software publisher, converted the data into a digital form suitable for recording on the particular storage medium selected, processed the digital information into a format intended for the selected medium and then checked the result by an emulation process. Some or all of the formatted information would be tested in this manner.

Unfortunately, the emulative testing did not enable testing of the entirety of the information, and did not enable testing in a manner which duplicated playback characteristics of the optical CD rom upon which the data would ultimately be recorded during disk manufacture and play back by the user. Thus, even though the result passed the emulation tests, once a test disk was made, further testing was required, based on testing of the test disk. This led to changes and further test disks, etc., as already explained.

Also, the service bureaus were few in number, and each tended to specialize in the format of a particular optical CD rom source. Each source has a slightly different mastering format, so that a different data format is required for each separate source (brand) of optical CD rom.

The process of testing software undergoing development by emulation, rather than by full simulation, has drawbacks and may lead to unsatisfactory results. This approach is typified by the creation of a large data base on a large computing system or "mainframe" other than the target machine where it is intended to be run. Emulation testing occurs after the data base has been assembled. In an emulation test, a small subset of the data base is loaded into a target machine, such as a personal computer, and then run in the intended environment, but not at real data retrieval speed. In this prior approach, the personal computer was acting as an emulator, rather than as a full simulator, in testing only a small fraction of the data base undergoing development at some speed other than the ultimate retrieval/data processing speed. Any attempt to test a large data base by parsing it into small portions and testing each small portion in this manner will be extremely time consuming and may not provide an accurate assessment of overall data base performance in the target environment.

Thus, there has been a largely unsolved need for a system for simulating performance of programs and data bases stored on delayed access time media which enabled large programs and data bases intended for distribution to users e.g. via CD rom to be fully emulated and debugged in the target operating environment without the delays and costs associated with e.g. creating multiple iterations of test disks.

SUMMARY OF INVENTION WITH OBJECTS

A principal object of the present invention is to provide a performance simulation development system which overcomes the limitations and drawbacks of the prior art.

Another object of the present invention is to provide a performance simulation which simulates not only the retrieval of data from a particular medium but also the speed of retrieval of the data within its particular arrangement proposed for the medium without first having to fix the data onto that medium.

One more object of the present invention is to provide a performance simulation system operating environment which enables interactive test, debug, indexing, edit and alteration of software undergoing development on a continual basis and ready performance simulation thereof without delays and expenses otherwise associated with creating test versions of the target medium, such as compact disk read only memory ("CD rom").

A further object of the present invention is to provide a performance simulation environment for use with a host computer which has two selectable operating speeds: a high speed development speed which operates as fast as possible during the software development process, and a simulation speed which models the operating characteristics of the storage medium, such as CD rom.

Yet one more object of the present invention is to provide a performance simulation system which may be connected directly to and used with a target computing machine, so that software being developed may be simulated on the target machine with its particular computational speed, and its configuration of memory and accessories, such as touch key pads, touch screen, etc.

Still another object of the present invention is to provide a performance simulation system which includes a standard bus interface, such as the small computer system interface ("SCSI"), together with a third party bus controller, and device drivers, so that the system may be connected to and used on line at full speeds and at simulation speeds and conditions with a wide variety of different kinds of target computing machines, each with its own particular operating system and hardware characteristics, without need for first installing the simulation software into each such machine.

Yet a still further object of the present invention is to provide a highly versatile mass storage and data handling system for bus level attachment to one or more host computers of the same or different type in a manner which combines large capacity tape storage capability with large capacity fixed disk random access and retrieval storage in a way which directly enables the mass storage and data handling subsystem to provide full simulation of data storage and retrieval operations of predetermined mass storage media and systems in accordance with control programming of the host computer.

One more object of the present invention is to provide a complete in-house CD rom real time full simulation and premastering environment enabling creation of master tapes for direct generation of CD rom disks without need for pressing test disks during the debug and CD rom transfer and adaptation processes, thereby providing to the user complete in-house control of the entire CD rom publishing process.

One more object of the present invention is to provide a performance simulation system which enables users to conduct disk data retrieval tests, determine how well commercially available retrieval software packages fit their data, develop and test their own retrieval software packages, add indexes and conduct beta testing without pressing a single CD rom test disk.

Yet one more object of the present invention is to provide a performance simulation for developing data for storage and retrieval via CD rom in a manner which enables mastering and premastering media to be recorded in file structures selectively compatible with the formats of a variety of mastering facilities (CD rom disk manufacturers).

Still one more object of the present invention is to provide a software development and simulation system which has the capability of being connected to any one of a wide variety of auxiliary memory mass storage computer appliances and subsystems, such as a CD rom playback unit for example, and thereupon determine and record the operational characteristics of such unit and its media so that it may thereafter be simulated as part of the software development function.

These objects are achieved in a method for simulating the operation of mass storage read only memory playback of data without requiring the use of the predetermined storage medium, such as optical compact digital disk (CD rom) in conjunction with a predetermined host computer. The method comprises the steps of:

a. storing the data in a high access speed memory device;

b. calculating the expected access time of the optical read only memory playback in conjunction with the predetermined host computer for a particular operation of the playback unit;

c. retrieving selected portions of the data from the high access speed memory device, and d. presenting retrieved selected portions of the data to the user over a time period corresponding to the calculated expected access time.

These and other objects, advantages and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
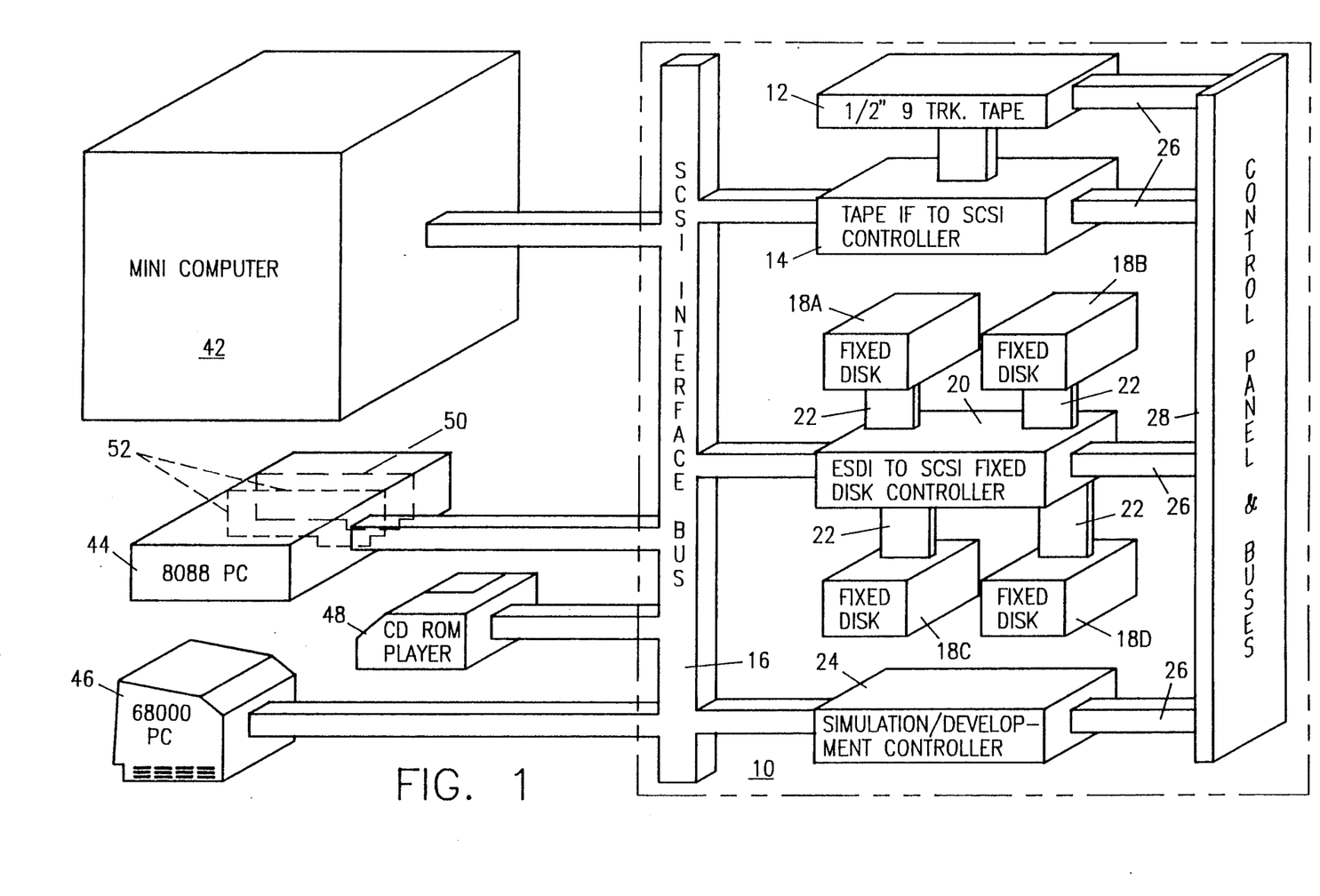
FIG. 1 is an overall block diagram of a software development system incorporating the principles of the present invention.
Figure 2:
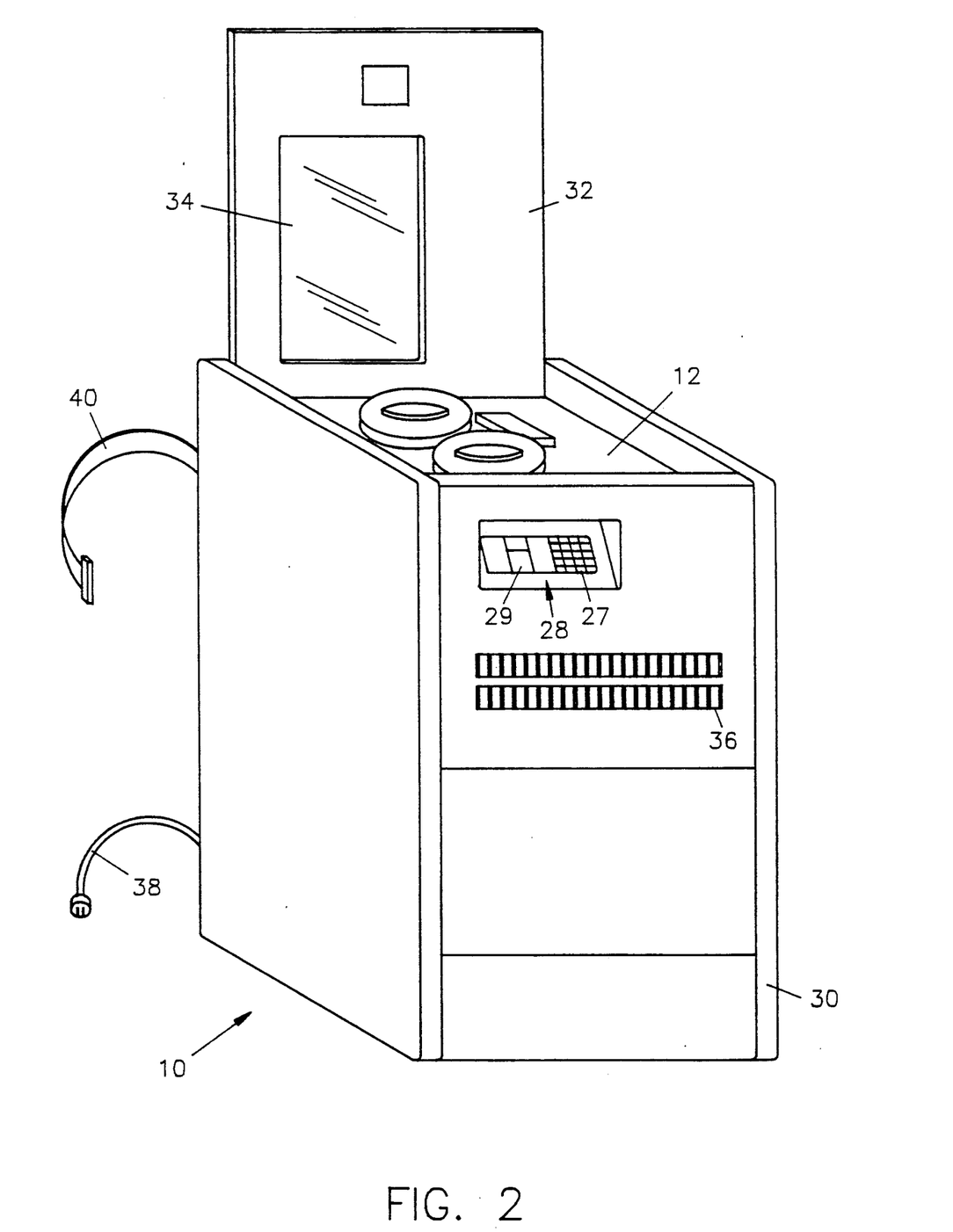
FIG. 2 is an isometric front view in elevation of the hardware element making up the software development system illustrated in FIG. 1.

A system for simulating performance of programs and data bases stored on delayed access time media shown in functional overview in FIG. 1 includes a hardware unit 10 illustrated in FIGS. 1 and 2, and control software, the function of which is described in conjunction with FIG. 3, hereinafter.

The hardware unit 10 includes a transfer media 12 such as a one half inch, nine track, ANSI compatible digital tape storage subsystem having an interface 14 to a SCSI interface bus 16 and having a storage capacity from approximately 100 to 1000 megabytes. The transfer media 12 may be the above described and preferred one half inch tape storage system, Storage Technology model 2922, or its equivalent, or alternatively may be a digital audio tape cassette recorder, a magneto-optical disk storage unit with removable media, or an 8 mm cassette tape drive by Exabyte Corporation. All of these media subsystems may be used as the transfer media subsystem 12. The transfer media 12 is a vehicle for entering data into the simulation system as well as a media for outputting data files from a mass storage unit fixed disk drive 18 to data storage transfer media suitable for transmittal to mastering facilities. The transfer media subsystem 12 is controlled through the interface 14, which is a Pertec tape drive interface to SCSI interface controller unit, or may also be controlled directly via control signals sent over a SCSI (Small Computer System Interface) bus 16 which extends throughout the hardware unit 10 and which enables connection to external computing machines and appliances, as will be discussed in greater detail hereinafter.

The hardware unit 10 also includes at least one fixed disk drive 18. Four units 18A, 18B, 18C and 18D, connected to a common controller 20, are shown in FIG. 1 in a daisy chain control connection and direct data connection via an ESDI standard interface 22 to the controller 20. The controller 20 includes a SCSI interface and connects directly to the SCSI bus 16, as shown in FIG. 1. The controller 20 not only converts the ESDI interface for each drive 18 into the SCSI interface convention, it also provides conventional fixed disk controller functions for the hardware unit 10. Each fixed disk drive 18 is preferably a very high capacity, high performance unit having a storage capacity of at least 300 megabytes formatted, with an average track access time of e.g. 29 milliseconds. With the four disk drive units 18A, 18B, 18C and 18D shown in FIG. 1, the hardware unit 10 provides 1.2 gigabytes on line via the SCSI bus. The disk drives may be treated as a single logical mass store and partitioned into various partitions, as will be more particularly explained hereinafter.

The hardware unit 10 also preferably includes a simulation/development supervisory controller 24. This supervisory controller 24 is preferably implemented as a self-contained computing system which is located within the housing of the hardware unit 10. It includes a very high speed processor which operates in accordance with control programming. The supervisory controller 24 is directly connected to the SCSI bus 16, and it thereby is able to control the operations of the transfer media controller 14 and the disk file controller 20 in accordance with its supervisory program. Programming for the supervisory controller may be loaded via the transfer media subsystem 12, or it may be loaded from fixed disk 18, or it may be provided from an external computer to which the SCSI bus 16 of the hardware unit 10 is connected.

The transfer media subsystem 12, its controller 14, the fixed disk file controller 20 and the supervisory controller 24 are connected via a control bus 26 to a control panel 28 which is accessible to an operator of the system for simulating performance of programs and data bases stored on delayed access time media hardware unit 10. FIG. 2 shows the control panel 24. It includes an array, 27 of input keys, and an arrangement of indicator lamps and signals 29.

The hardware unit 10 is preferably contained within a suitable enclosure 30 which is adapted to contain the transfer media subsystem 12 at the top thereof. A closeable lid 32, hinged to the enclosure, when lifted up provides access to the tape transport portion of the tape deck 12 so that the tape reels may be changed. A window 34 of transparent material in the lid 32 enables the operator of the hardware unit 10 to observe the operation of the tape deck 12. Ventilation holes 36 provide for air circulation cooling of the elements contained within the enclosure 30. A power plug 38 and a multiconductor cable 40 extending from and part of the SCSI bus 16 provide connections to a primary power source and external computing machinery and accessory appliances directly related to software development and with which the system is being or to be used. Although only one SCSI cable 40 is shown in FIG. 2, it is to be understood that as many SCSI interface cables (with related signal drivers, etc.) as may be required by a particular application are provided by the hardware unit 10.

Referring again to FIG. 1, the hardware unit 10 is shown being in connection with three external computing machines a large minicomputer 42, such as a Digital Equipment Corporation VAX$^{tm}$ computer operating under the VMS operating system, for example; an Intel 8088/8086/80286, etc., based personal computer 44, such as the IBM Personal Computer tm family of computers operating under the MS-DOS operating system, for example; and, a Motorola 68000 based personal computer 46, such as the Apple McIntosh tm personal computer operating under the McIntosh Operating System, for example. Other computing machines, such as intelligent work stations of the type made by Apollo and Sun, may also be effectively connected to the hardware unit 10. The units 42, 44 and 46 are shown by way of exemplifying the wide variety of differing computer operating system environments which may be simultaneously on-line with the hardware unit 10 of the software development system.

The hardware unit 10 is also shown connected to an optical mass storage device 48, such as a Philips Compact Disc Read-Only Memory Drive, model CM100/25, which is directly adapted for playing back 12 cm diameter CD-rom digital disks having a formatted capacity approximating 600 megabytes per disk. This particular player is only one of a number of CD-rom players presently available, and it has its own performance characteristics. Other players, presently existing, and under development at the time of this application, may have different performance characteristics. One important aspect of the present invention is that the hardware development system be able directly to characterize and record the performance characteristics of any one of an unlimited variety of e.g. optical disk CD-rom playback units, so that full and true simulations of performance of such unit may be accomplished with respect to software undergoing development for distribution via optical media intended for use with such unit. The direct connection of the hardware unit 10 to the player 48 makes possible the characterization and recordal of its characteristics for simulation purposes. Moreover, the direct connection to the playback unit 48 also enables the overall computing environment to access and use data stored on media capable of being read by the unit 48 in conventional fashion.

The connections of the computers 42, 44 and 46, and the connection of the playback unit 48, to the hardware unit 10 is directly made via the SCSI bus 16. Each computer and appliance to which the hardware unit 10 is connected via the SCSI interface includes a suitable SCSI bus interface (hardware). The advantage of such an arrangement is that multiple computers and appliances may be on line with the system for simulating performance of programs and data bases 40 stored on delayed access time media hardware unit 10 without need for special circuitry for any particular computer or appliance.

Thus, this arrangement means that software may be developed in a McIntosh Operating System environment for use with the McIntosh Computer 46 at the same time that software is being developed in the MS-DOS or UNIX environment for the IBM Personal Computer family 44. In this arrangement, the software development system of the present invention acts as a chameleon in the sense that it assumes a full compatibility appearance to each different operating system environment of the on-line computers without regard to the other operating system environments also presently on-line with the system.

In order to carry out simultaneous simulation, it is necessary to partition the physically attached disk drive devices 18A, 18B, 18C and 18D among the various operating system environments. Each operating system may obtain disk storage space by virtue of one or more partitions. The partition information is written to the directory of each disk drive. Thus, each operating system may determine its proper disk storage space merely by consulting the directory of each disk drive. The various partitions are created by a program which enables the user to partition the disks into whatever partitions may be required by, or advantageously used in the simulation operating environment.

By way of example illustrating multiple computers simultaneously connected to and operating with the hardware unit 10, a SCSI interface host adapter board 50 is shown by the dashed line profile installed within an expansion slot of the IBM Personal Computer 44. Such host adapters for connecting the internal PC bus to the SCSI bus 16 are readily available. Similar host adapters are provided for the DEC VAX machine 42 and for the Apple McIntosh machine 46. The CD-rom playback unit 48 also comes with a SCSI port, thereby enabling direct connection to the SCSI bus 16 of the hardware unit 10.

In a simplified configuration of the hardware development system, such as a system devoted solely to software development within the IBM Personal Computer environment, the simulation/development controller 24 within the hardware unit 10 may be replaced by a simplified timing accessory board 52. This timing board 52 is shown by dotted line outline as installed in one of the expansion slots within the IBM Personal Computer 44 in FIG. 1. In this simplified embodiment of the invention, all of the development process control/simulation software is loaded into the IBM Personal Computer 44 from e.g. floppy disks, and the actual simulation of CD-rom is carried out by system operations including the central processing element of the IBM Personal Computer 44. Precise simulation timing is made possible by the timing board 52, working in conjunction with the PC processor under program control.

One of the advantages of the system for simulating performance of programs and data bases 40 stored on delayed access time media of the present invention is that it enables development and adaptation of large software data bases to CD-rom format as fast as possible, typically at very high speeds characteristic of "mainframe" computers, such as the Digital VAX 42.

Typically, existing large data bases which are to be adapted for storage and retrieval with optical CD-rom media require indexing in accordance with the format of the particular media/playback environment. This is so that the blocks of information comprising the data base in original format are rearranged and ordered so as to match the data block format selected for the optical media. The particular arrangement selected controls one of the important performance aspects of CD-rom: access time. Depending upon the data arrangement selected for the data base, the performance of the CD-rom playback unit may be commercially acceptable, or it may have so many performance flaws and delays as to amount to an unsuccessful product. Thus, it is most advantageous that formatting of large data bases for adaptation to CD-rom, for example, be carried out as quickly as possible.

Once a large data base or application program is indexed for CD-rom, it then needs to be tested. As already mentioned, testing heretofore has required either the pressing of a test disk at considerable expense, or has been by way of emulation and unreliable. After the data base undergoing development processing with the present system has been indexed for CD-rom in a high speed operation, the performance of this huge collection of data as proposed to be embodied in CD-rom media may be precisely and fully simulated by an unlimited variety of tests.

The simulation function of the present invention enables the user to specify the particular CD-rom media and playback unit to the system, and the particular type of test to be carried out.

Once the simulation parameters have been selected and/or loaded into the simulation processor 24, the present system enters the simulation mode. In this mode, the user operates the attached computer, such as the IBM Personal Computer 44, for example, as if it were attached to the CD-rom playback unit being simulated. The large data base or application program being developed is then presented to the user via the particular personal computer just as it would appear if actually fixed in a test CD-rom disk. The delays and "quirks" of the particular program and hardware environment may be fully assessed by the user to determine any correctable deficiencies which may be related, e.g. to the location of the data or the algorithm used to process it in the particular hardware environment. Special features of the computer, such as touch screen, touch keys, "mice", floating point accelerators and coprocessors, core memory size, cache memory, etc., may also be fully simulated and evaluated by the user with the present system. Thus, the software may be optimized for particular hardware environments and processing speeds, and commercially acceptable programs and data bases suitable for distribution and use via CD-rom media playback may thus be realized, all without ever having to manufacture a test disk.

Figure 3:
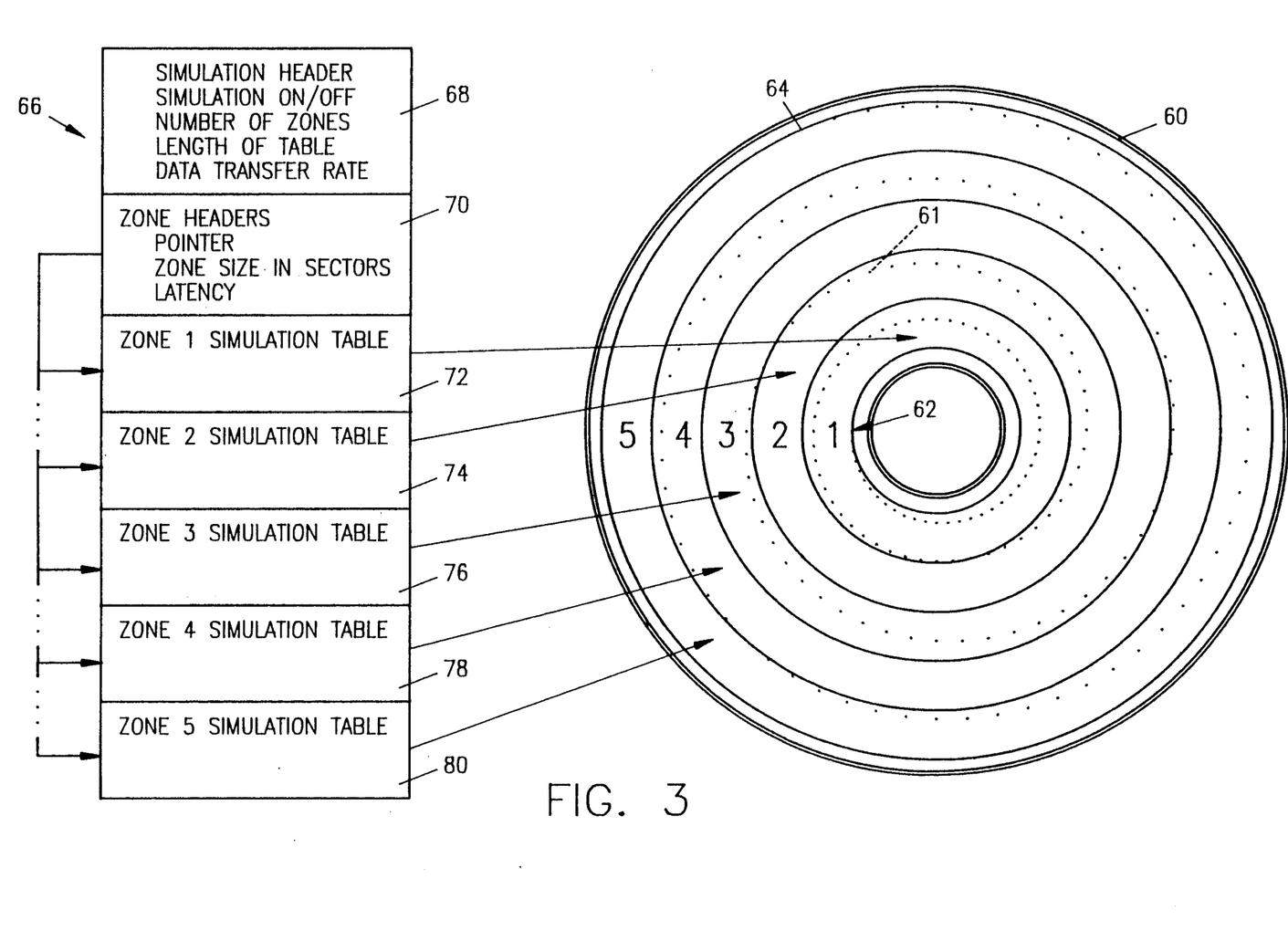
FIG. 3 is a graph of a simulation data table in juxtaposition with a read only memory compact disk in a manner which is illustrative of operation of the software development system illustrated in FIG. 1.

One example of simulation of CD rom by the hardware unit 10 is illustrated in conjunction with FIG. 3. Therein, a CD rom disk 60 is illustrated diagrammatically. One purpose of the hardware unit 10 is to simulate this disk 60 in a manner which will enable a software publisher to assess and improve the performance of its software, without need for actually fabricating the disk 60 in order to test its performance. In this particular example it is understood that the disk 60 typically contains approximately 270,000 separate 2048 byte sectors, although it may contain as many as 324,000 such bytes or 660,000,000 bytes of information.

All of the sectors are arranged along a single spiral track 61, which the CD rom player playback head always follows in track following servo mode. The locus of the track 61 is set forth in grossly exaggerated form in FIG. 3 by the dotted line. The other operational mode of the CD rom player is a seek, which comprises a controlled radial jump from one radial location on the disk 60 to another radial location on the disk 60. Included in the seek latency are factors such as angular or rotational offset to the destination starting sector location and radial distance from the departure ending sector to the new starting sector. The CD rom playback unit reads the disk 60 from an innermost region 62 of the spiral track 61 to an outermost region 64 of the track at a constant linear data rate. The implication of this constant linear, rate is that the rotational angular velocity of the disk 60 is faster at the innermost region 62 of the track 61 and slower at the outermost region of the track.

While a constant linear data rate is presently the format practiced, a constant angular velocity with appropriate spacing between the data transitions on the data surface is also capable of being simulated by the hardware unit 10.

In accordance with the principles of the present invention, a simulation table is provided to the user (preferably in a format which may be readily edited by the user, such as an ASCII file). This table is processed into a suitable machine readable format to create a simulation table 66 shown in FIG. 3. This table 66 enables the hardware unit 10 to carry out an accurate simulation of performance of the CD rom disk 60.

There may be a wide variety of tables available to the user, depending upon the kinds and sector sizes of the disks to be simulated.

A version of the table 66 is placed into a device driver region of the operating system program memory of the particular computer which will be carrying out simulation of the CD rom disk 60. Since the hardware unit 10 is capable of being simultaneously connected to a wide variety of different types of computers, e.g. via the SCSI interface bus 16, each different computer would have a version of the table 66 tailored to its own particular characteristics and requirements (as well as the characteristics of the CD rom playback device being simulated). Table 66 may alternatively be generated and used in conjunction with a control program executed by a simulation processing unit within the hardware unit 10, in which case the hardware unit 10 would act as a stand-alone simulation unit without need for connection to any particular computer.

The table 66 includes a simulation header 68 which sets forth overall operating conditions including data transfer rate (assumed to be a constant with a constant linear data rate scheme); a simulation on/off flag; a number which indicates the number of zones into which the disk 60 is divided by the simulation process, as will be explained shortly; a timing loop (i.e. the number of passes through a software delay loop which takes one millisecond; this provides calibration for a software timer; alternatively, a precise one millisecond hardware timer may be used to provide the delays requisite for providing an accurate simulation); and, the maximum size of the table 66.

A zone is defined as a band of sequential sectors of the spiral track 61, starting at a certain location and ending at another certain location on the disk 66. The particular number of zones for the simulation is user selectable. In practice, the simulation of CD rom has resulted in the selection of five zones 1, 2, 3, 4, and 5. These zones are shown as contiguous circumferential bands in FIG. 3.

A zone header block 70 of the table 66 contains headers for the e.g. five zones which are defined in order to carry out the simulation. For each zone header the table sets forth a latency value, the size of the zone in sectors, and the starting address of the simulation data for each zone. Following the header block 70 are e.g. five simulation data tables 72, 74, 76, 78, and 80.

In order to perform a simulation of e.g. CD rom, the system must know where the head is presently located and where it is to be moved. The number of sectors to be read must also be known. The time of the last read from the departure sector must also be known. From this information, the simulation computer obtains a seek delay from one of the tables 72, 74, 76, 78 or 80, depending upon the number of sectors between the departure sector and the destination sector. The simulation computer obtains the latency value from the zone including the departure sector, and it determines the amount of time required for data transfer based upon the number of sectors being read.

Figure 4:
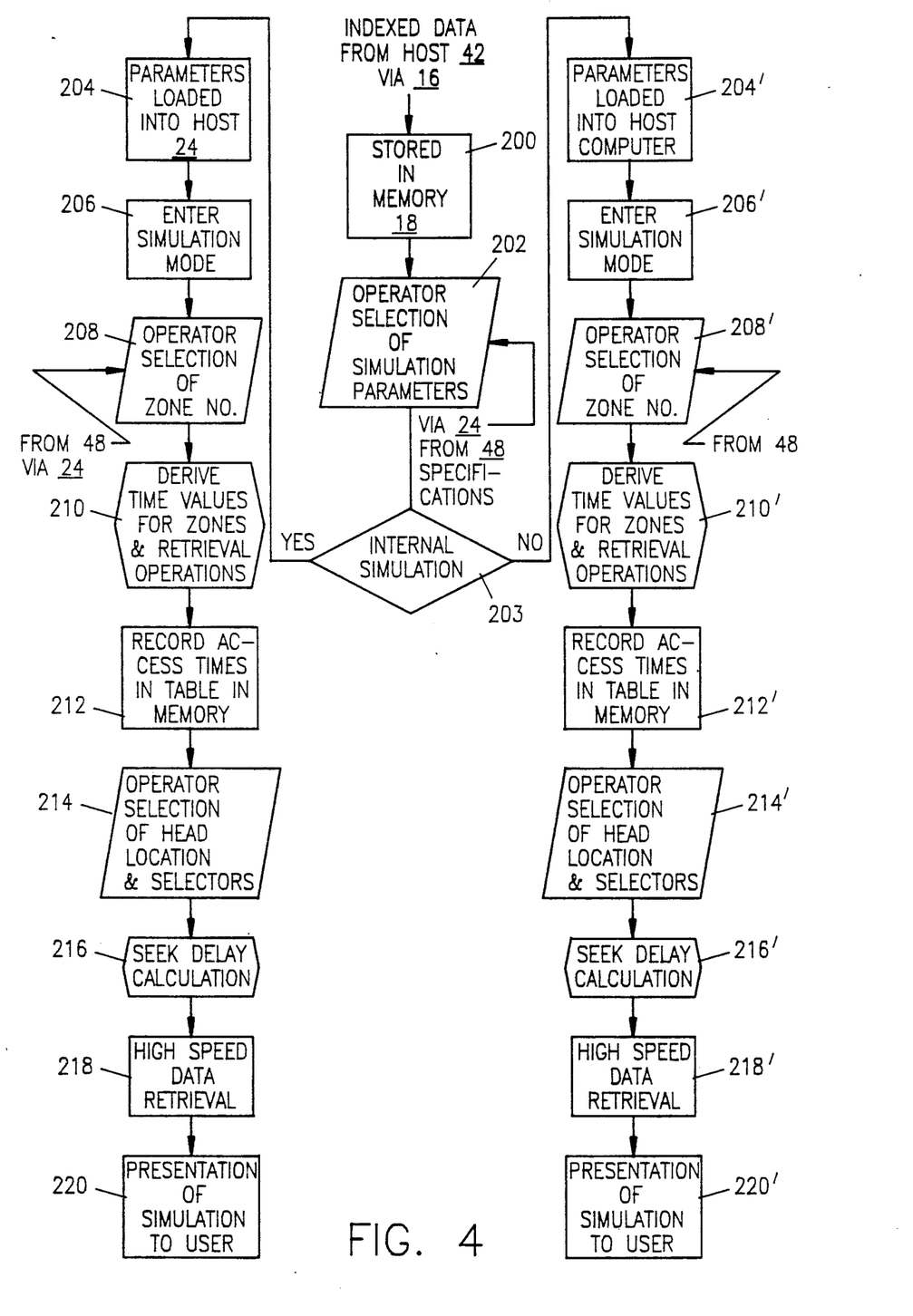
FIG. 4 is a flow chart of a program illustrating the principles and practice of the present invention.

The sum of these determinations establishes a simulation of the overall amount of time required to transfer the data from an actual data disk through the CD rom playback unit into a target host computer memory. The actual amount of time required by the simulation system to transfer the data (shorter than the CD rom playback unit) is subtracted from the determined simulation time; and the simulation computer then enters one or more delay loop wait states for this time difference, either before, during or after actual data transfer during the simulation. This process thereby enables the simulation system to mimic closely the performance of a particular CD rom playback unit, together with a predetermined host computer. FIG. 4 is a flowchart that illustrates the simulation process in accordance with the principles of the present invention. The data from the host computer 42 is indexed and transferred to disk drive memory 18 via interface 16 at a step 200. Using the specifications of the mass storage device 48, the operator selects the simulation parameters at a step 202 using the supervisory controller 24. A logical mode 203 tests whether the simulation is to be carried out internally or in an external computer. The selected parameters may then be loaded into simulated controller 24 at a step 204 or directly into an external host computer 42, as shows at step 204'. The external simulation steps are identical to the internal process, and have corresponding reference numbers. The simulation mode is entered in a step 206 following the loading of the parameters. At step 208, the operator manually selects the number of zones using the specifications from the storage device 48, and enters the selections via supervisor controller 24. At step 210, time values are derived from the zone and retrieval position selections, and the values are recorded as access time in table form at step 212. The operator inputs head location and sector information at step 214. Following seek delay calculations at step 216, the data is retrieved at high speed at step 218 for presentation to the user at step 220.

Here follows one example of a portion of a table (ASCII format) for simulating a Philips cm100 CD rom. This example sets forth data for the five zones. In this example, header information is followed by two columns of numbers. The left column equals the relative distance in sectors from the departure sector to the destination sector, and the corresponding value to the right of each number of the left column equals simulation delay in milliseconds. These simulation delay values are determined empirically, based on the particular playback characteristics of a given playback unit within a particular operating system environment.

Zone 1
band size = 53969 sectors (stored in header 70)
latency = 86 milliseconds (stored in 70)
1 = 131
2 = 144
3 = 157
4 = 171
5 = 184
6 = 197
7 = 211
8 = 224
9 = 237
10 = 251

-continued
11 = 264
12 = 277
13 = 291
14 = 304
15 = 317
16 = 331
17 = 344
18 = 357
19 = 371
20 = 384
40 = 651
60 = 917
80 = 606
100 = 599
120 = 623
140 = 585
160 = 578
180 = 540
200 = 654
400 = 385
600 = 376
800 = 537
1000 = 777
1200 = 880
1400 = 1002
1600 = 1018
1800 = 958
2000 = 980
4000 = 919
6000 = 1374
8000 = 1094
10000 = 1430
12000 = 1170
14000 = 1627
16000 = 1436
18000 = 1274
20000 = 1416
40000 = 1832
60000 = 1875
80000 = 2586
100000 = 2201
120000 = 1934
140000 = 2068
160000 = 2300
180000 = 2498
200000 = 2466

Zone 2
band size = 53969
latency = 135
1 = 170
2 = 183
3 = 197
4 = 210
5 = 223
6 = 237
7 = 250
8 = 263
9 = 277
10 = 290
11 = 303
12 = 317
13 = 330
14 = 343
15 = 357
16 = 370
17 = 383
18 = 397
19 = 410
20 = 423
40 = 690
60 = 957
80 = 539
100 = 565
120 = 589
140 = 615
160 = 479
180 = 423
200 = 568
400 = 369
600 = 443
800 = 468
1000 = 810

-continued

```
     1200 =  819
     1400 =  984
     1600 =  774
     1800 =  964
     2000 =  941
     4000 =  863
     6000 = 1437
     8000 = 1017
    10000 = 1375
    12000 = 1333
    14000 = 1341
    16000 = 1202
    18000 =  941
    20000 = 1219
    40000 = 1818
    60000 = 1862
    80000 = 1372
   100000 = 1832
   120000 = 1968
   140000 = 2058
   160000 = 2123
   180000 = 2271
   200000 = 2696
        Zone 3
band size = 53969
  latency =  164
        1 =  201
        2 =  215
        3 =  228
        4 =  241
        5 =  255
        6 =  268
        7 =  281
        8 =  295
        9 =  308
       10 =  321
       11 =  335
       12 =  348
       13 =  361
       14 =  375
       15 =  388
       16 =  401
       17 =  415
       18 =  428
       19 =  441
       20 =  455
       40 =  722
       60 =  988
       80 =  485
      100 =  463
      120 =  489
      140 =  515
      160 =  397
      180 =  471
      200 =  641
      400 =  318
      600 =  471
      800 =  425
     1000 =  906
     1200 =  897
     1400 = 1029
     1600 =  863
     1800 =  740
     2000 =  807
     4000 =  922
     6000 = 1383
     8000 = 1041
    10000 = 1370
    12000 = 1079
    14000 = 1163
    16000 = 1130
    18000 =  996
    20000 = 1158
    40000 = 1693
    60000 = 2028
    80000 = 1436
   100000 = 1855
   120000 = 1997
   140000 = 2020
   160000 = 2080
        Zone 4
band size = 53969
```

```
  latency =  189
        1 =  229
        2 =  242
        3 =  255
        4 =  269
        5 =  282
        6 =  295
        7 =  309
        8 =  322
        9 =  335
       10 =  349
       11 =  362
       12 =  375
       13 =  389
       14 =  402
       15 =  415
       16 =  429
       17 =  442
       18 =  455
       19 =  468
       20 =  482
       40 =  749
       60 = 1015
       80 =  404
      100 =  451
      120 =  498
      140 =  546
      160 =  593
      180 =  420
      200 =  467
      400 =  331
      600 =  354
      800 =  318
     1000 =  774
     1200 =  785
     1400 = 1012
     1600 =  738
     1800 =  901
     2000 =  783
     4000 =  751
     6000 = 1361
     8000 = 1175
    10000 = 1334
    12000 = 1055
    14000 = 1046
    16000 = 1091
    18000 =  970
    20000 =  945
    40000 = 1399
    60000 = 1358
    80000 = 1711
   100000 = 1821
   120000 = 1900
   140000 = 2187
   160000 = 2257
        Zone 5
band size = 53969
  latency =  212
        1 =  252
        2 =  266
        3 =  279
        4 =  293
        5 =  306
        6 =  319
        7 =  333
        8 =  346
        9 =  359
       10 =  373
       11 =  386
       12 =  399
       13 =  413
       14 =  426
       15 =  439
       16 =  453
       17 =  466
       18 =  479
       19 =  493
       20 =  506
       40 =  773
       60 = 1039
       80 =  575
      100 =  598
```

-continued

```
   120 =  621
   140 =  644
   160 =  607
   180 =  447
   200 =  531
   400 =  454
   600 =  434
   800 =  410
  1000 =  872
  1200 =  840
  1400 = 1051
  1600 =  707
  1800 =  726
  2000 =  804
  4000 =  768
  6000 = 1565
  8000 = 1212
 10000 = 1030
 12000 = 1100
 14000 =  895
 16000 = 1095
 18000 =  955
 20000 =  997
 40000 = 1272
 60000 = 1112
 80000 = 1667
100000 = 1691
120000 = 1579
140000 = 1933
160000 = 2002
180000 = 2142
200000 = 2445
``` sector size = 2048 (not stored, but must be known)
transfer rate = 153586 bytes/sec (stored in header 68)
number of zones = 5 (stored in header 68)

Having thus described an embodiment of the invention, it will now be appreciated that the objects of the invention have been fully achieved, and it will be understood by those skilled in the art that many changes in design and construction and widely differing embodiments and applications of the invention will suggest themselves without departure from the spirit and scope of the invention. The disclosures herein are purely illustrative and are not intended to be in any sense limiting of the invention, the scope of which is more particularly defined by the following claims.

We claim:

1. A method for simulating predetermined transfer operations of blocks of data in a target data storage unit having a first data access time and being intended for use with a host computer, wherein the simulation occurs on a separate storage memory having a second data access time which is faster than said first data access time, and during simulation all of the blocks of the data are contained in the separate storage memory to which a simulation computer has direct high speed access, the simulation not requiring the blocks of data to be pre-fixed on the media target data storage unit, the method comprising the steps of:
   a. determining, for a transfer operation by which data is transferred from the target data storage unit to a host computer, the units of time required for such transfer in accordance with said first data access time of the target data storage unit,
   b. fixing the time of direct access by the simulation computer to the data stored in the separate storage memory to correspond to the duration of the calculated performance time by adjusting the effective rate at which data is transferred from the separate storage memory to the simulation computer to correspond to the time required by the determining step,
   c. retrieving the data from the separate storage memory based upon said second data access time and transferring the retrieved data to said simulation computer in accordance with the fixed time of direct access, and
   d. providing the results of the direct access to the user.

2. The method for simulating predetermined transfer operations set forth in claim 1 wherein the step of determining the units of time required for such transfer comprises the steps of recording a table of time values for possible operations of the target data storage unit, storing the table in the separate storage memory accessible by the simulation computer and selection of a particular value depending upon the particular transfer operation to be simulated.

3. The method for simulating transfer operation set forth in claim 1 further including the step of using the host computer as the simulation computer.

4. The method for simulating transfer operation set forth in claim 1 wherein the target data storage unit is a CD rom.

5. The method for simulating transfer operation set forth in claim 1 wherein a plurality of simulation computers connected to the separate storage memory simultaneously perform simulated transfer operations.

6. The method for simulating transfer operation set forth in claim 2 wherein the step of recording a table of time values includes the step of determining a plurality of operating zones for the target data storage unit and includes the step of deriving time values for each zone.

7. The invention of claim 1 wherein the step of adjusting the effective rate of data transfer includes causing the simulation computer to enter into delay loop wait states.

8. The invention of claim 7 wherein the simulation computer is caused to enter into delay loop wait states either before, during or after the actual data transfer.

9. A method for simulating on a simulation computer the operation of optical read only memory playback of data in conjunction with a predetermined host computer without use of pre-fixed optical data storage media, the simulation occurring in a separate storage memory, wherein the optical read only memory has a first data access time, the method comprising the steps of:
   a. storing the data in a high access speed memory device having a second data access time faster than the first data access time,
   b. calculating the expected access time of the optical read only memory playback in conjunction with the predetermined host computer for a particular retrieval operation upon the data;
   c. performing said particular retrieval operation upon the data by operating the high speed memory device based upon the second data access time to retrieve the data, and
   d. transferring the retrieved data to the simulation computer in accordance with the expected access time.

10. The method for simulating the operation of optical read only memory playback set forth in claim 9 wherein the step of calculating the expected access time of the optical read only memory playback in conjunction with the predetermined host computer for a particular retrieval operation upon the data comprises the steps of empirically determining access times for retrieval operations of the particular playback unit and recording the times so determined in a lookup table.

11. The method for simulating the operation of optical read only memory playback set forth in claim 10 wherein the read only memory playback unit incorporates a helical track locus of contiguous sectors of data, and wherein the table is divided into a predetermined number of zones of contiguous sectors.

12. The method for simulating the operation of optical read only memory playback set forth in claim 9 wherein a plurality of simulations are carried out simultaneously for a plurality of host computers of varying types.

13. The method for simulating the operation of optical read only memory playback set forth in claim 12 comprising the step of partitioning the high access speed memory device among the plural simulations simultaneously ongoing.

14. A software development system for simulating the operation of a data storage device having a first data access time without requiring that such device be a part of the development system, the system comprising
a simulation computer and an operational memory means for recording direct access time data corresponding to the times of predetermined operations to be simulated,
high access speed memory means having a second data access time faster than said first data access time for storing the data for which the data storage device operations are to be simulated,
input means for receiving a particular data operation from the user, and
processing means for processing the particular data operation by determining the location of the data in the high access speed memory means and for operating the high access speed memory means to retrieve the data based upon the second data access time and for transferring the retrieved data for use by the simulation computer in accordance with the direct access time data.

15. The software development system set forth in claim 14 wherein the high access speed memory means comprises at least one high capacity, high performance disk drive.

16. The software development system set forth in claim 15 wherein the disk drive is connected through a disk drive controller to the simulation computer.

17. The software development system set forth in claim 16 wherein the disk drive includes a partition directory indicative of storage partitions for a plurality of operating systems, and wherein the controller is connected through a multi-host interface bus to a plurality of simultaneously operable simulation computers, each having its own operating system.

18. The software development system set forth in claim 14 including means for characterizing operations of the data storage device including means enabling the data storage device to be connected directly thereto and operated, in order that operations of the data storage device may be recorded and characterized automatically.

19. The software development system set forth in claim 14 wherein the data storage device is a CD rom.

20. A method for simulating, in a simulation computer having a memory device having a first data access time, the playback operation of an optical read only memory device having a second data access time operating in conjunction with a host computer wherein the second data access time is known and is greater than the first data access time, comprising the steps of
a. storing data in the memory device in the simulation computer,
b. calculating the expected time for retrieving the data from the optical read only memory device,
c. retrieving the data from the memory device based on the first data access time, and
d. adjusting the rate at which the data is used by the simulation computer to correspond to the expected time for retrieval from the optical read only memory device by causing the simulation computer to enter into at least one wait state before, during, or after the actual transfer of the data from the memory device.

* * * * *